US 6,732,112 B1

(12) United States Patent
Nagatomo et al.

(10) Patent No.: US 6,732,112 B1
(45) Date of Patent: May 4, 2004

(54) NETWORK SYSTEM

(75) Inventors: Yasuhito Nagatomo, Suwa (JP); Shinji Kubota, Suwa (JP); Tadashi Kinebuchi, Suwa (JP); Hiroyuki Baba, Suwa (JP); Masanori Konishi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/051,046

(22) PCT Filed: Aug. 1, 1997

(86) PCT No.: PCT/JP97/02688

§ 371 (c)(1),
(2), (4) Date: May 4, 1998

(87) PCT Pub. No.: WO98/06037

PCT Pub. Date: Feb. 12, 1998

(30) Foreign Application Priority Data

Aug. 2, 1996 (JP) .............................................. 8-220614

(51) Int. Cl.⁷ .............................................. G06F 17/00
(52) U.S. Cl. ..................... 707/102; 707/200; 707/101
(58) Field of Search ............ 707/1–206; 709/100–332; 345/326–327; 705/26; 379/93.17

(56) References Cited

U.S. PATENT DOCUMENTS 5,706,507 A * 1/1998 Schloss ....................... 345/326
5,809,250 A * 9/1998 Kisor ......................... 709/227

(List continued on next page.)

FOREIGN PATENT DOCUMENTS

| JP | A-62-256121 | 11/1987 |
| JP | A-2-206817 | 8/1990 |
| JP | A-3-152641 | 6/1991 |
| JP | A-3-192416 | 8/1991 |
| JP | A-5-265890 | 10/1993 |
| JP | A-5-274078 | 10/1993 |
| JP | A-5-274527 | 10/1993 |
| JP | A-7-168853 | 7/1995 |

OTHER PUBLICATIONS

Hartman et al., :VoiceXML builder: a workbench for investigating voiced–based applications, Frontiers in Education Conference, 2001, 31st Annual, vol. 3, Oct. 10–13, 2001, pp. S2C –6–9 vol. 3.*

(List continued on next page.)

*Primary Examiner*—David Jung
(74) *Attorney, Agent, or Firm*—Oliff & Berridge, PLC

(57) ABSTRACT

There is provided a network system in which, when the data of a plurality of pages having a hyperlinked structure is prepared for a server machine, a user can easily access an arbitrary service of an arbitrary page by using keys arranged on a user terminal.

The network system includes a server machine and a plurality of user terminals 30.

The server machine includes a memory for storing data of a plurality of pages having a hyperlinked structure described in a language along the specification of the HTML, and setup data described in the language along the specification of the HTML to perform allocation of functions of keys of the user terminal for each page and explanation of the functions allocated to the respective keys.

Each of the user terminals 30 includes a plurality of keys 42 and processing means for displaying a page supplied from the server machine on a display 32. The processing means reads, when another page is selected by a key operation of a user, setup data of the corresponding other page from the server machine, sets up the functions of the keys 42, and performs a setup operation for displaying explanation of the functions of the keys 42 on the display 32.

27 Claims, 11 Drawing Sheets

U.S. PATENT DOCUMENTS

| | | | | |
|---|---|---|---|---|
| 5,835,087 A | * | 11/1998 | Herz et al. | 345/327 |
| 5,860,068 A | * | 1/1999 | Cook | 705/26 |
| 5,923,736 A | * | 7/1999 | Shachar | 379/93.17 |
| 6,571,279 B1 | * | 5/2003 | Herz et al. | 707/10 |
| 6,625,651 B1 | * | 9/2003 | Swartz et al. | 707/10 |
| 6,633,878 B1 | * | 10/2003 | Underwood | 707/100 |

OTHER PUBLICATIONS

Geethakumary et al., Malayam speech sounds and their mapping to Unicode symbols: a case study, Language Engineering Conference, 2002, Proceedings, Dec. 13–15, 2002, pp. 201–207.*

Holmes, Mitigating Microsoft with virtual consoles, Computer, vol. 31, Issue 7, Jul. 1998, pp. 105–106, 109.*

* cited by examiner

 
Fig. 7A   Fig. 7B
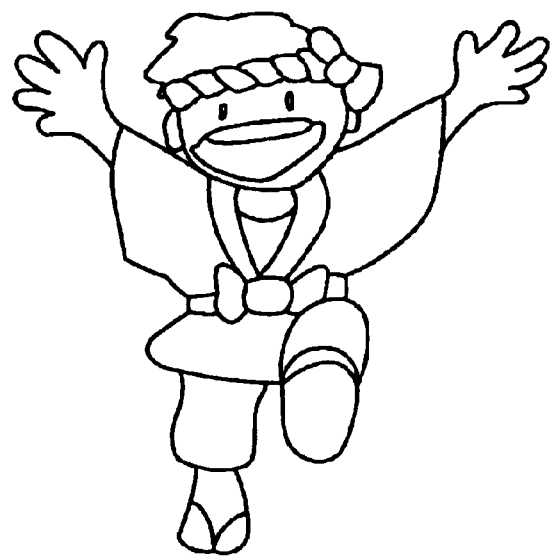
Fig. 7C

MENU: RETURN TO MAIN MENU OF SERVICE

PREVIOUS ARTICLE: SWITCH DISPLAYS OF PIECES OF MERCHANDISE

NEXT ARTICLE: FORWARD AND BACKWARD

ORDER: ORDER DISPLAYED MERCHANDISE

ACCOUNTING: DISPLAY ACCOUNT

CONCRETE EXAMPLE FOR SETTING UP MULTI-FUNCTION F1 TO F5 KEYS TO FOLLOWING FUNCTIONS

[SET FUNCTION]

F1 : RETURN TO MAIN MENU OF DEDICATED CONTENTS
F2 : ADVANCE
F3 : RETURN
F4 : INPUT URL
F5 : SWITCH FRAMES

[DESCRIPTION IN HTML]

< A href "mainmenu.html" keynumber = "1" keyoffsrc = "menu.gif" fixed >
< NAVKEY function "1" keynumber = "2" keyoffsrc ="forward.gif"> : ADVANCE
< NAVKEY function "2" keynumber = "3" keyoffsrc ="back.gif"> : RETURN
< NAVKEY function "3" keynumber = "4" keyoffsrc ="url.gif"> : U R L
< NAVKEY function "4" keynumber = "5" keyoffsrc ="frame.gif"> : FRAME

Fig. 10

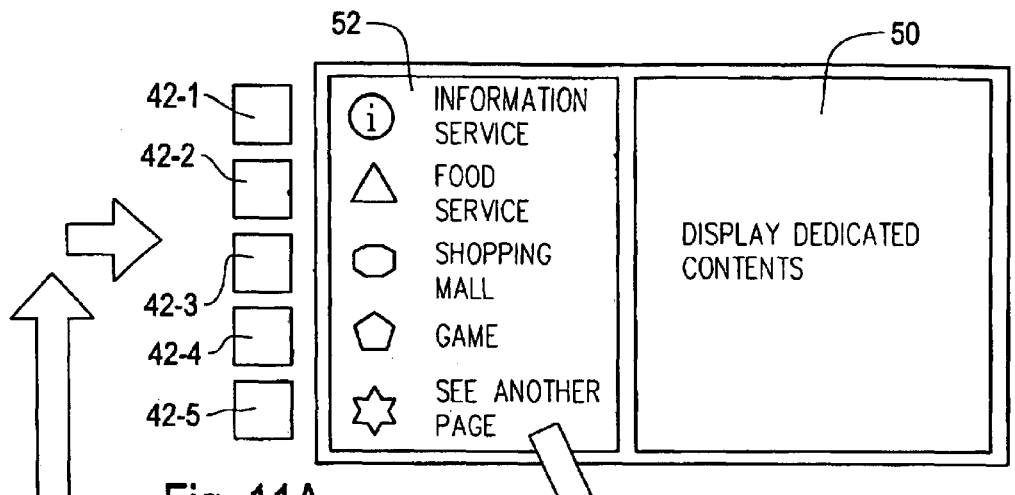
Fig. 11A
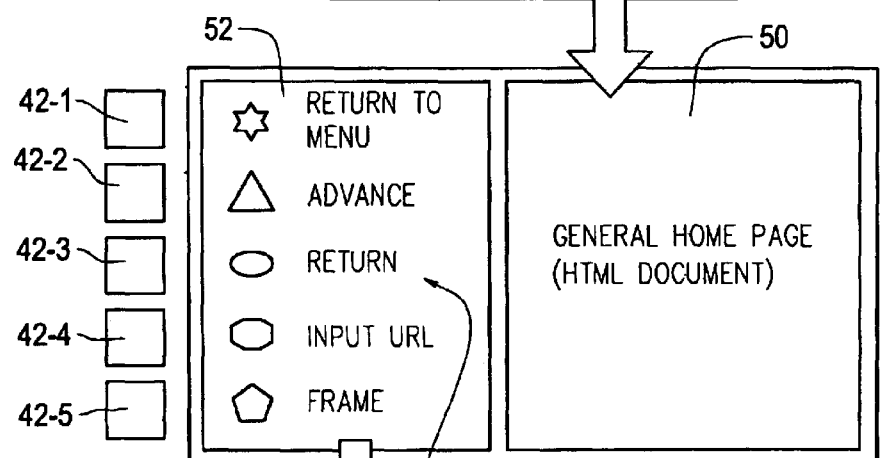
Fig. 11B
Fig. 11C
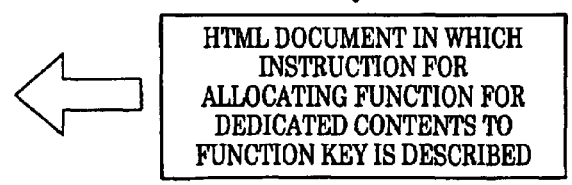
Fig. 11D

NETWORK SYSTEM

BACKGROUND OF THE INVENTION

1. Field of the Invention

The present invention relates to a network system in which a page of a server, in particular, a page described in a language being structured and along the specification of the HTML, can be searched and seen from a user terminal by using a Web browser.

2. Background of the Related Art

A conventional network system in which a server machine is connected to a plurality of user terminals through lines is popularly used. Various techniques used on the Internet can also be used as group ware in view of transmission of information and sharing of information. For this reason, in accordance with popularization of the Internet, an internal network using the Internet techniques, i.e., an intranet has been developed to be practically used.

At present, such an intranet is used as an information presenting means in an office or an organization. However, the present inventor has examined that such an intranet is used as a local area network for presenting a specific service to a user.

In this case, as in a general intranet, a server machine is connected to a plurality of user terminals through a network. In the server machine, the information of services to be presented is prepared as a plurality of pages described in a language along the specification of the HTML and having a hyperlink structure. A Web browser is set in each user terminal. A user accesses each page of the server machine from a user terminal by using the Web browser to search various services or the like.

In an intranet system for presenting such services, a personal computer is not used as a user terminal, and a portable terminal having a small size and a light weight is often used.

In this user terminal, in general, only a flat panel display and a limited number of keys are often arranged.

Therefore, a manner of accessing hyperlinked documents by using a limited number of keys to obtain necessary information is an important problem.

In particular, when hyperlinked document pages are accessed, functions allocated to the respective keys change depending on the pages, and each key is often used as a multipurpose key. In this case, a manner of notifying the functions of the keys changing depending on the pages to a user such that the user can easily understand the functions is an important problem.

A page, prepared for a server machine, for presenting a service is often updated according to a change in service at any time. In this case, a manner of notifying a change in function of each key of the user terminal to a user such that the user can easily understand the change in function is an important problem.

In addition, the following case is often used. That is, different types of services are prepared on the server machine side, and a plurality of pages corresponding to the services are prepared. In this case, in the user terminal, a navigation function for accessing an arbitrary page must be set as the multipurpose key according to the contents of a service. However, the navigation function allocated to each key changes depending on the type of a service to be accessed or a page to be accessed at any time. In this case, if the navigation function of each key which changes at any time cannot be notified to a user such that the user can easily understand the navigation function, the user cannot access a desired page. Even if the user can access the desired page, it is expected that return from the corresponding page to the original home page cannot be performed.

SUMMARY OF THE INVENTION

The present invention has been made in consideration of the above problems, and has as its object to provide a network system, a server machine, and a user terminal in which, when the data of a plurality of pages having a hyperlink structure is prepared for the server machine, a user can easily access an arbitrary service of an arbitrary page by using keys arranged on the user terminal.

In order to achieve the object, the invention may be characterized in that, in a network system including a server machine and a plurality of user terminals the server machine comprises a first storage device for storing data of a plurality of pages having a hyperlinked structure described in a language along the specification of the HTML, and setup data described in the language along the specification of the HTML to perform allocation of functions of keys of the user terminal for each page and explanation of the functions allocated to the respective keys;

each of the user terminal may comprises a plurality of keys, and a processing device for displaying a page supplied from the server machine on a display;

The processing means max include:

a key allocation device for reading, when another page is selected by a key operation of a user, setup data of the corresponding other page from the server machine, setting up the functions of the keys, and performing a setup operation for displaying explanation of the functions of the keys on the display.

Here, the server machine preferably stores the contents of a service to be presented as the data of a plurality of pages having a hyperlinked structure.

The server machine and the user terminal are preferably formed as in the inventions.

The invention may be a server machine connected to a user terminal through a network system, and include a device in which data of a plurality of pages having a hyperlinked structure described in a language along the specification of the HTML is stored, and a device in which setup data described in the language along the specification of the HTML to perform allocation of functions of keys of the user terminal for each page and explanation of the functions allocated to the respective keys is stored.

Data of a desired page and setup data corresponding to the data are formed such that both the data can be read by the user terminal.

The invention may be a user terminal connected to a server machine, in which data of a plurality of pages having a hyperlinked structure described in a language along the specification of the HTML and setup data described in the language along the specification of the HTML to perform allocation of functions of keys of the user terminal for each page and explanation of the functions allocated to the respective keys are stored, through a network system.

A plurality of keys may be provided along with a processing device for displaying a page supplied from the server machine on a display.

The processing device may comprise a key allocation device for reading, when another page is selected by a key operation of a user, setup data of the corresponding other page from the server machine, setting up the functions of the keys, and performing a setup operation for displaying explanation of the functions of the keys on the display.

In the network system according to the present invention, the data of a plurality of pages having a hyperlinked structure may be stored in a first storage device of the server machine. Here, the Internet techniques can be directly used, all the data of the pages are described in a language along the specification of the HTML such that the contents of the data can be displayed on the user terminal as text screens.

In each user terminal, a Web browser for accessing a page of the server machine is set. A user uses the user terminal to access each page of the server machine described in a language along the specification of the HTML, and displays the corresponding page on the display of the user terminal. Therefore, the user can see a page for presenting a service stored in the server machine.

In particular, since the plurality of pages stored in the server machine have a hyperlinked structure, a user can reach a desired page while sequentially seeing pages from the start page read at the beginning to the next page according to the contents of a service to be searched.

At this time, pages displayed on the user terminal are always changed by operating keys prepared for the terminal side. The user terminal is formed to have a small size and a light weight, and the number of prepared keys is small such that an infinite number of users can easily operate the user terminal with a small number of key operations. For this reason, the keys of the user terminal are used as multifunction keys to which different functions are allocated for each page.

As the characteristic feature of the present invention, an arrangement in which setup data described in a language along the specification of the HTML, in particular, a language extended within the rules of the HTML is stored in the first storage device of the server machine to perform allocation of the functions of the keys of the user terminal and explanation of the functions allocated to the respective keys in association with the data of each page is employed.

When the user operates a desired key to read the next page which is hyperlinked and to display the page on the display, the explanation of the functions of the keys allocated to the page is read from the server machine as setup data. In this manner, when the image of a page supplied from the server machine is displayed on the display of the user terminal, the explanation of the functions of the keys allocated to the corresponding page is also displayed.

As described above, according to the present invention, the functions corresponding to the corresponding page can be allocated to the respective keys of the user terminal for the pages which are hyperlinked. In addition, since setup data used in this allocation is described in a language along the specification of the HTML, the explanation of the functions which are newly allocated can be displayed on the display. As a result, a user terminal which is extremely useful for a user can be formed.

Therefore, according to the system of the present invention, users can easily access desired pages from a plurality of user terminals connected to the server machine, and the users can receive services which are desired by the respective users.

Although the setup data may be formed as data which is completely different from the page of a corresponding page, the setup data is preferably formed for data management. More specifically, the setup data is preferably described to be included in the data of the corresponding page.

The invention may be is characterized in that the setup data is formed to perform allocation of navigation functions of the keys for each page and explanation of the navigation functions allocated to the respective keys, and the processing device of each of the user terminals sets up the navigation functions of the respective keys and displays the navigation functions of the keys on the display.

The invention may be is characterized in that the setup data is formed to perform allocation of the navigation functions of the respective keys for each page and explanation of the navigation functions allocated to the keys.

The invention may be is characterized in that setup data is formed to perform allocation of the navigation functions of the respective keys for each page and explanation of the navigation functions allocated to the keys, and the processing device sets up the navigation functions of the respective keys and displays the navigation functions of the keys on the display.

Here, the navigation function includes a function of tracing pages which are hyperlinked.

According to the system of the present invention, navigation functions corresponding to a displayed page are allocated to the keys of the user terminal. Explanation of the navigation functions of the respective keys is displayed on the display device.

Therefore, for example, when a start page of the server machine is displayed on the server machine, the image of the next page which is hyperlinked can be accessed by operating only a predetermined key to which the navigation function is allocated. When a new page is displayed on the display, navigation functions corresponding to the displayed new page are allocated to the keys of the user terminal, and the explanation of the functions is displayed on the display.

In this manner, when a user accesses a desired page by using a user terminal while performing navigation among a plurality of pages prepared for the server machine, the user can correctly determine the navigation keys allocated for each page on the basis of the function explanation on the display, and can easily and correctly use the navigation keys.

In particular, according to the present invention, a user terminal comprising a limited number of keys can easily and correctly access a plurality of pages and a network system, which is extremely useful, for presenting services can be realized.

The inventions may be characterized in that the setup data is formed such that the functions allocated to the keys are displayed as explanation images.

As the explanation image, a still image or a moving image may be used if necessary, or a photograph, an animation, or the like may be used.

According to the present invention, the functions allocated to the keys of the user terminal are displayed as explanation images on the display of the user terminal. For this reason, a user can recognize the functions allocated to the keys such that the user can more easily visually understand the functions. As a result, the utility for users is more improved.

In particular, according to the present invention, when the function explanation of the keys is displayed as an explanation image, a user can pleasantly perform key operations, and a system which is more familiar and useful can be realized.

The inventions may be characterized in that
the setup data
is formed such that the functions allocated to the respective keys are displayed as different explanation images in an operation state and a non-operation state of the keys.

According to the present invention, when the functions allocated to the respective keys of the user terminal are displayed by using explanation images which are different in an operation state and a non-operation state of the keys, a user can visually feel use of the keys, and a more useful user terminal can be provided.

The inventions may be characterized in that
the processing device
displays a screen displayed on the display such that the screen is divided into a page display area for displaying a page supplied from the server machine and a function display area for displaying function explanation of the keys.

According to the present invention, the screen displayed on the display of the user terminal is displayed such that the display screen is divided into a page display area for displaying a page supplied from the server machine and a function display area for displaying function explanation of the keys. For this reason, a user terminal having good visibility for a user and being more useful can be realized.

Here, the page display area is preferably displayed adjacent to the keys arranged on the user terminal. In this manner, the correspondence between the keys and their function explanation is made clear, and function explanation having good visibility can be performed.

The invention may be characterized in that
the server machine comprises
a second storage device in which a Web browser for user terminals and data subordinate to the Web browser are stored to search pages having a hyperlinked structure, and
each of the user terminals comprises
a storage device in which a boot program for downloading the Web browser and the data subordinate to the Web browser from the second storage device in the user terminal at the start of the user terminal, and causing the processing device to display a start page of the server machine and to perform a setup operation of the keys corresponding to the start page is stored.

The invention may be characterized in that
the server machine comprises
a storage device in which a Web browser for user terminals and data subordinate to the Web browser are stored to search pages having a hyperlinked structure, and
at the start of each of the user terminals, downloads the Web browser and the data subordinate to the Web browser on the corresponding user terminal.

The present invention
may include
a storage device in which a boot program for downloading, from the server machine in which a Web browser for user terminals and data subordinate to the Web browser are stored, the Web browser and the data subordinate to the Web browser on the corresponding user terminal at the start of the corresponding user terminal to search pages having a hyperlinked structure, and causing the processing device to display a home page of the server machine and to perform a setup operation of the keys corresponding to the home page is stored, and is characterized in that the boot program is operated at the start of the corresponding user terminal.

According to the present invention, the Web browser and the data subordinate to the Web browser which are downloaded on each user terminal are stored in the server machine in advance. The Web browser is software used to search pages prepared for the server machine and having a hyperlinked structure.

In each user terminal, the boot program for downloading the Web browser and the data subordinate to the Web browser from the server machine to the corresponding user terminal at the start of the corresponding user terminal is stored.

In this manner, each user terminal automatically downloads the Web browser and the data subordinate to the Web browser on the corresponding user terminal at the start of the corresponding user terminal, so that a display of the start page of the server machine and the setup operation of the keys corresponding to the start page can be performed.

With the above arrangement, in the system according to the present invention, the same Web browser and the same data subordinate to the Web browser can be necessarily downloaded on a plurality of user terminals, and the settings of the user terminals can be made equal to each other.

In addition, in order to update the Web browser and the data subordinate to the Web browser used in each user terminal into another Web browser and another data, it is satisfactory that a Web browser and data subordinate to the Web browser which are prepared for the server machine in advance are replaced with other ones. For this reason, version up and change of the entire system can be easily realized.

The invention may be is characterized in that
the data of the plurality of pages includes
data of a card data input page having a card data setting item of a user and described in a language along the specification of the HTML such that card data input from a card reader is automatically set as the data of the card data setting item.
Each of the user terminal comprises
a card reader for inputting data of a card; and
The processing device
automatically sets the card data input from the card reader as the data of the card data setting item while the card reader input page is displayed.

The invention may be characterized in that
the data of the plurality of pages includes
data of a card data input page having a card data setting item of a user and described in a language along the specification of the HTML such that card data input from a card reader is automatically set as the data of the card data setting item.
The invention
may include a card reader for inputting data of a card.
The data of the plurality of pages includes
data of a card data input page having a card data setting item of a user and described in a language along the specification of the HTML such that card data input from the card reader is automatically set as the data of the card data setting item; and The processing device automatically sets the card data input from the card reader as the data of the card data setting item while the card data input page is displayed.

In the system according to the present invention, a user may use a user terminal to make electronic settlement of, e.g., on-line shopping. In this case, the user inputs the data of her/his own card by using a card reader arranged in the user terminal.

Assume that such electronic settlement is made in conventional on-line shopping, then when a user inputs card data, the card data cannot be loaded on the card reader until a focusing operation which is performed such that the user clicks the card payment item on the screen with a mouse. This operation is cumbersome.

In contrast to this, according to the present invention, when a card data input page is displayed, a user can input card data from the card reader at any time without performing the above focusing operation. The input card data is automatically set as the data of the displayed card data setting item. For this reason, a system which is extremely useful for a user can be realized.

Here, in the card data input page, card data input items must be formed such that the number of items is equal to the number corresponding one card. When card data is input while a card data input page is displayed, the Web browser may be formed such that the input data is automatically set as the data of the card data setting item.

BRIEF DESCRIPTION OF DRAWINGS

FIGS. 7A, 7B, and 7C are schematic views for explaining animation characters displayed in a key table display area of the user terminal.

FIG. 10 is a view for explaining key allocation setup data described in a language along the specification of the HTML to allocate functions to multi-function keys of the user terminal.

FIGS. 11A, 11B, 11C, and 11D are views for explaining a procedure for accessing an external page from a start page by using the user terminal.

DETAILED DESCRIPTION OF PREFERRED EMBODIMENTS

A preferred embodiment of the present invention will be described below with reference to the drawings.

Figure 1A:
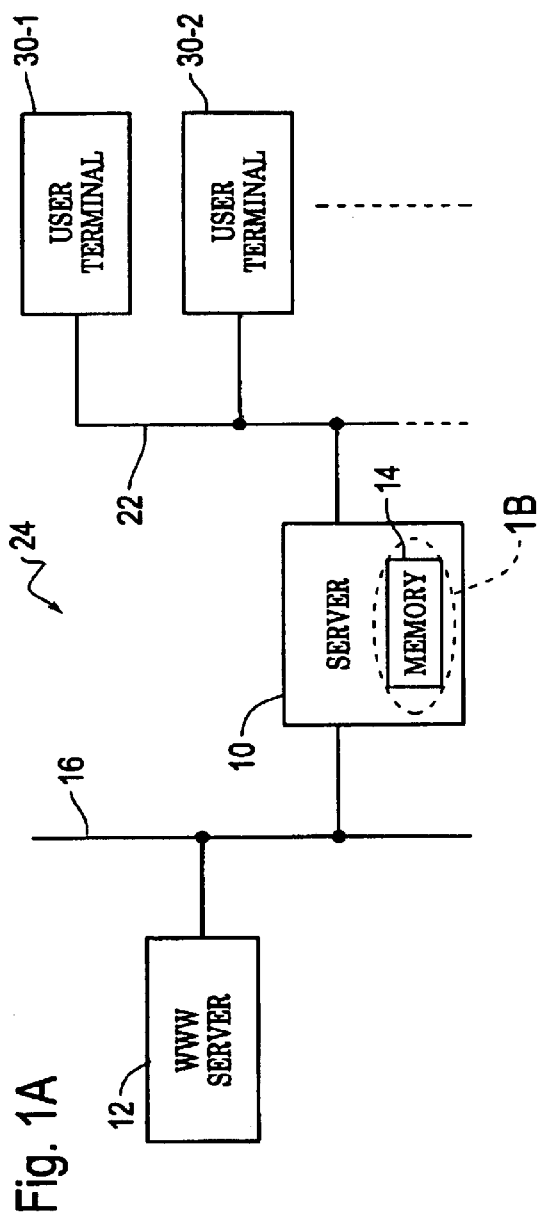
FIGS. 1A and 1B are schematic views of a network system according to the present invention.

FIG. 1A shows a preferred example of a network system to which the present invention is applied.

In the network system according to this embodiment, a server 10 for presenting a predetermined service is connected to a plurality of user terminals 30-1, 30-2, ... through a network line 22 to constitute an intranet 24.

In this embodiment, the intranet 24 is installed in, e.g., an amusement park, and the user terminals 30-1, 30-2, ... are arranged at tables in a restaurant placed in the amusement park.

The server 10 is connected to another WWW server 12 on the Internet through an Internet line 16, and the user terminal 30-1 is arranged such that the user terminal 30-1 can also access another WWW server 12 of an Internet line 20 through the server 10.

Figure 1B:
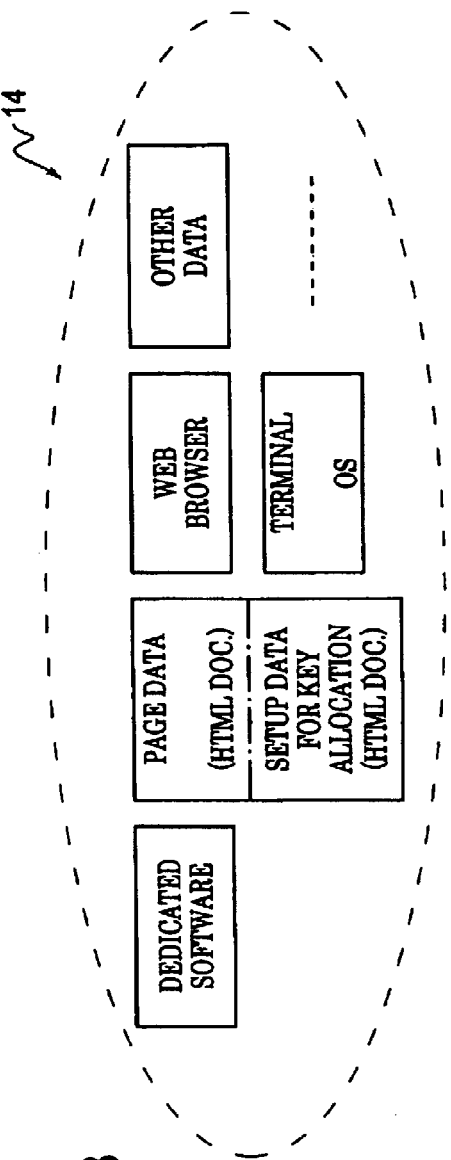

The server 10 is constituted by using a high-performance computer as well known, and a memory 14 in which various data are stored As shown in FIG. 1B, in the memory 14, dedicated software for operating a server itself, the data of a plurality of pages described in the language along the specification of the HTML to be hyperlinked, and setup data for allocating keys for each page described in the language along the specification of the HTML to the data of each page are stored. Here, a case wherein both the data are independently described is exemplified to easily understand the invention. However, in an actual product, in order to easily manage data and access the data, the setup data is described as the data of a part of a corresponding page.

In addition, in the memory 14, other data such as a Web browser for downloading data on each user terminal, a terminal OS, and a protocol are stored.

Figure 5:
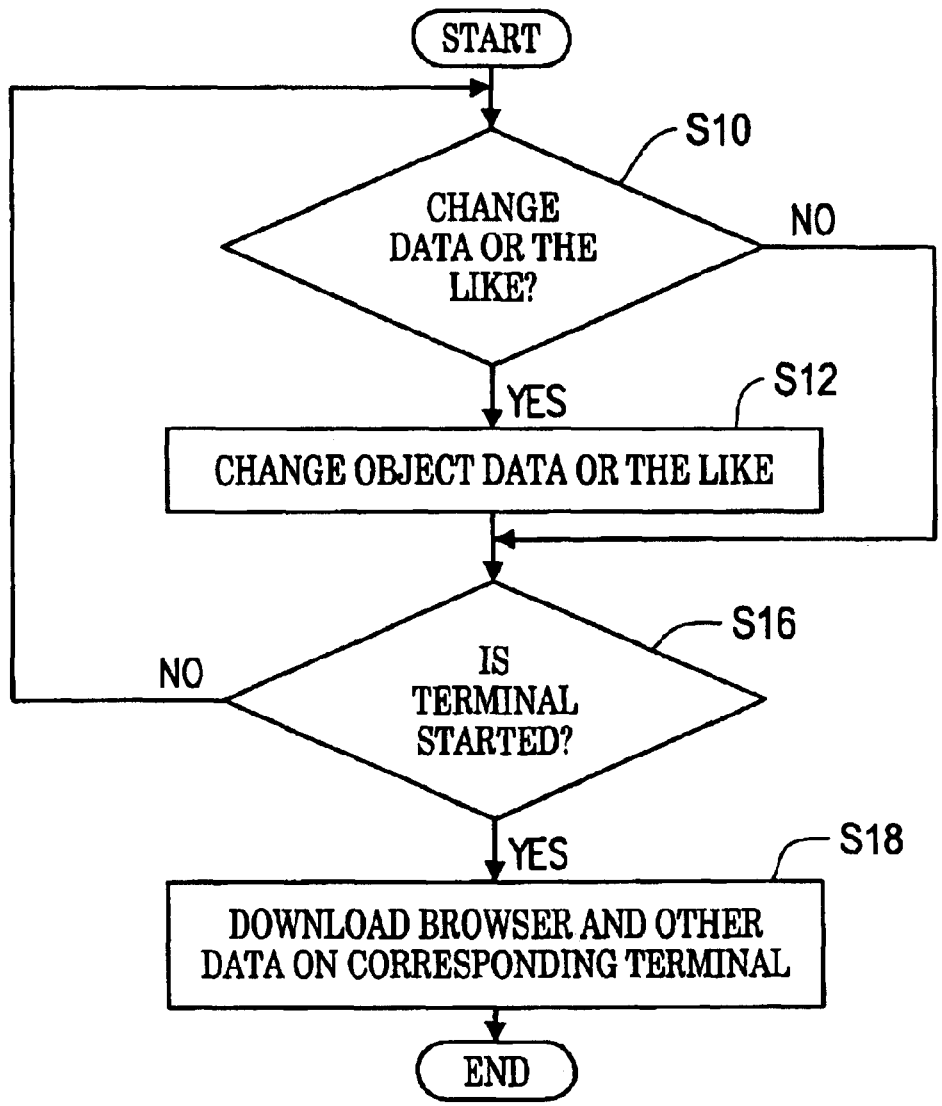
FIG. 5 is a flow chart showing the operation of a server.

FIG. 5 briefly shows an operation flow chart of the server 10.

In the system of this embodiment, when the power supplies of the user terminals 30-1, 30-2, ... of the system are turned on to start the system, the Web browser, the terminal OS, and other data are downloaded in the RAMs 84 (see FIG. 4) of the user terminals 30-1, 30-2, ... in response to the requests from the user terminals 30-1, 30-2, ... (to be described later) (steps S16 and S18).

Therefore, in a state wherein the system is started, the user terminals 30-1, 30-2, ... are set in the same state, and can be used by users.

When the data of the system must be changed (step S10), the data in the memory 14 of the server 10 is updated (step S12).

Thereafter, when the user terminals 30 are started, the user terminals 30-1, 30-2, ... are set in the same state on the basis of the changed data.

In this manner, according to the system of this embodiment, when only the contents of the memory 14 of the server 10 are updated, the user terminals 30-1, 30-2, ... serving as clients can be managed. For this reason, a load for managing the entire system can be considerably reduced.

The user terminals 30-1, 30-2, ... access the server 10 through the network line 22, read the page data stored in the memory 14, and display the page data on the displays of the corresponding user terminals.

Figure 2:
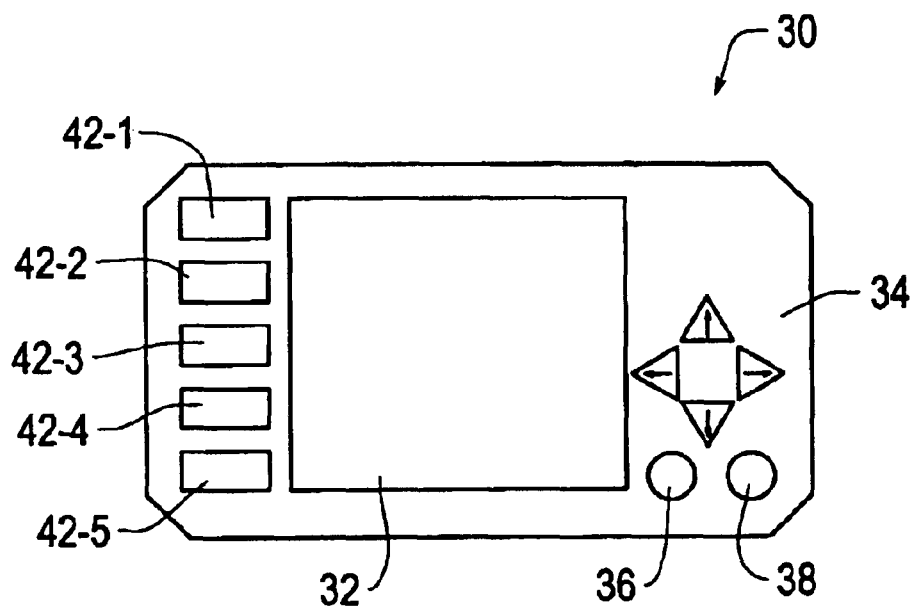
FIG. 2 is a view for explaining the appearance of a user terminal used in the network system shown in FIG.1.

FIG. 2 briefly shows the appearance of the user terminal 30.

The user terminal 30 according to this embodiment is formed to have a small size and a light weight such that the user terminal 30 can be arranged on a table of the restaurant without interfering. More specifically, an LCD display 32 is arranged at the center of the user terminal 30, and various operation keys are arranged on the left and right sides of the display 32. On the right side of the display 32, cursor operation keys 34 for moving a cursor to the upper, lower, left, and right sides, an OK key 36, and a cancel key 38 are arranged. On the left side of the LCD display 32, five multi-function keys 42-1, 42-2, . . . 42-5 are arranged in a line.

Figure 3:
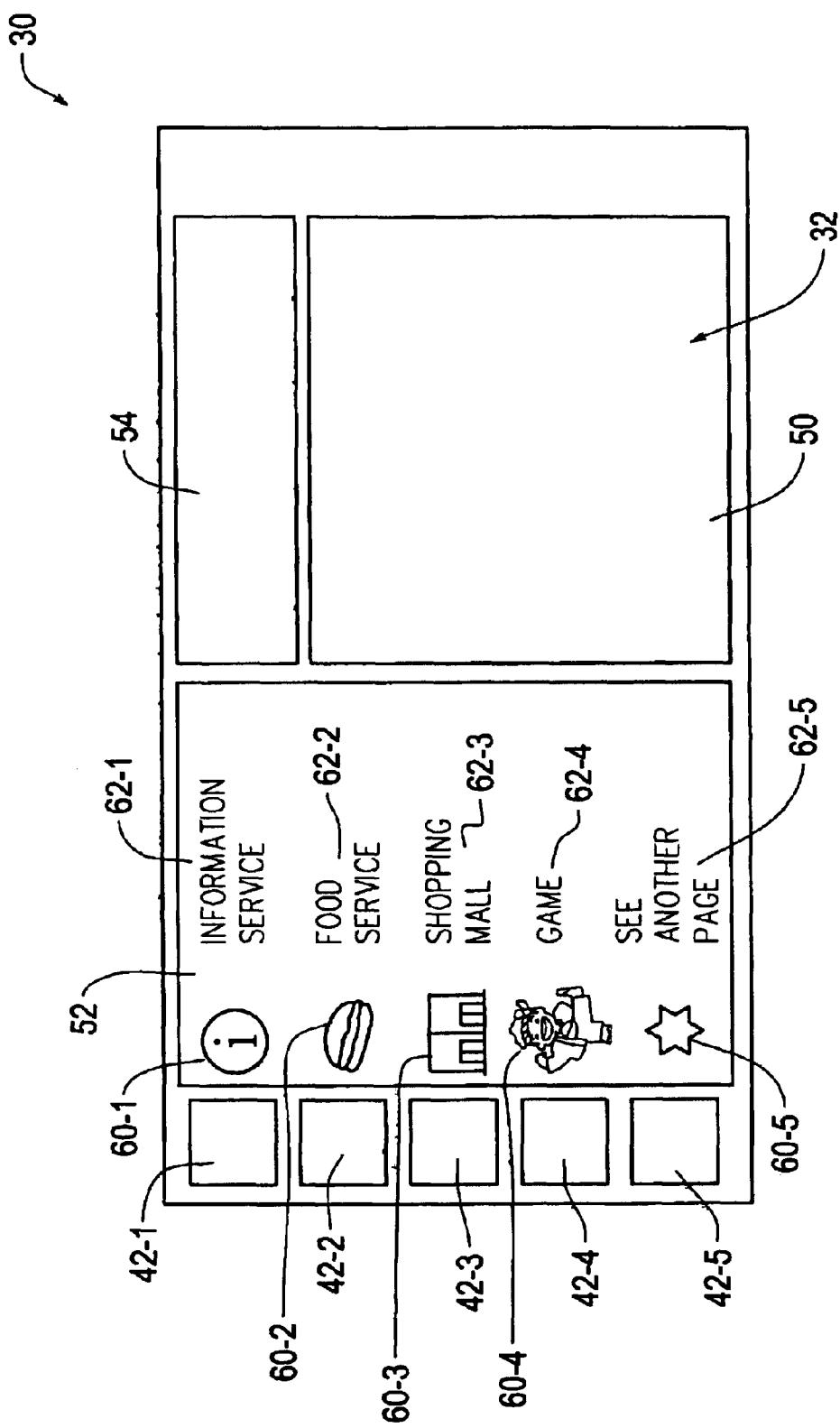
FIG. 3 is a view for explaining an example of a screen displayed on the user terminal.

FIG. 3 shows an example of a display screen on the display 32 of the user terminal 30.

In this embodiment, a contents display area 50 in which page data of the server 10 is displayed, a key table display area (function display area) 52 for displaying key functions allocated to the multi-function keys 42-1, 42-2, . . . 42-5, and a server message display area 54 for displaying a message which is transmitted from the server side are separately displayed. Note that the server message display area 54 may be formed to display a message if necessary.

The key table display area 52 is arranged adjacent to the multi-function keys 42-1, 42-2, . . . 42-5 to have a rectangular shape, and a plurality of animation characters 60-1, 60-2, . . . 60-5 and letter information 62-1, 62-2, . . . 62-5 which display the functions of the multi-function keys 42-1, 42-2, . . . 42-5 as animations and letters are displayed in the key table display area 52. In this embodiment, although an animation is used as the explanation image, another image, e.g., a photograph or the like may be used as the explanation image. As the explanation image, either of a still image and a moving image may be used if necessary.

For example, when an order function for a restaurant is allocated to the multi-function key 42-2, the character of sandwiches representing food is displayed as the animation character 60-2 corresponding to the multi-function key 42-2, and the letters of FOOD SERVICE are displayed as the letter information 62-2. For this reason, a user can instantaneously visually determine the functions allocated to the respective keys 42-1, 42-2, . . . 42-5.

In the contents display area 50, various pages of the server 10 are displayed as described above. In this embodiment, a plurality of pages stored in the memory 14 are sequentially browsed by using a Web browser (to be described later), so that the various pages can be displayed as images. At this time, depending on the contents of the pages displayed on the contents display area 50, functions allocated to the multi-function keys 42-1, 42-2, . . . 42-5 also change at any time.

It is the characteristic feature of this embodiment that, each time the functions allocated to the multi-function keys 42-1, 42-2, . . . 42-5, the animation character 60 and the letter information 62 displayed in the key table display area 52 are changed to be displayed such that the function allocation functions are displayed.

Navigation functions for browsing a plurality of pages which are hyperlinked are often allocated to the multi-function keys 42. For this reason, this embodiment is designed such that the navigation functions are changed to be displayed on the key table display area 52 each time the navigation functions change. Therefore, a user can easily access various pages stored in the server 10, and can receive a service from the server 10.

In the server message display area 54, various messages to be spontaneously transmitted from the server 10 are displayed to each user terminal. For example, a message, e.g., "ATTRACTION WILL BE HELD IN SQUARE FROM 7 p.m." is displayed, or a message, e.g., "YOUR ORDER HAS BEEN COMPLETED" is displayed at a restaurant. In addition, while these messages are not displayed, for example, various commercial messages may be displayed in the display area 54. If necessary, the area 54 may be closed to display the contents display area 50 in a wide region.

In this embodiment, it is important that, as described above, both the page data and the setup data for key allocation which are stored in the memory 14 are described by using a language extended along the rules of the Hyper Text Makeup Language (HTML) serving as a language for designing screens of the WWW of the Internet. For this reason, both the page data and the setup data can be displayed as screens having hyperlinked structures in the contents display area 50 and the key table display area 52 by using the Web browser, respectively. In particular, anchors hyperlinked to the next page are buried in the screens displayed in the display areas 50 and 52, and the operations of the anchors are allocated to the multi-function keys 42-1, 42-2, . . . 42-5, so that access to the next page by using the Web browser can be easily realized.

FIG. 10 shows a part of setup data described in a language along the specification of the HTML to execute allocation of multi-function keys shown in FIG. 11C (to be described later). Allocation of functions to the multi-function keys can be easily realized by a simple description in the language along the specification of the HTML. More specifically, in the HTML, for example, a tag, an attribute, or the like can be uniquely extended. For this reason, allocation of the functions to the respective multi-function keys can be performed by using a new tag, e.g., "NAVKEY" shown in FIG. 10.

Figure 4:
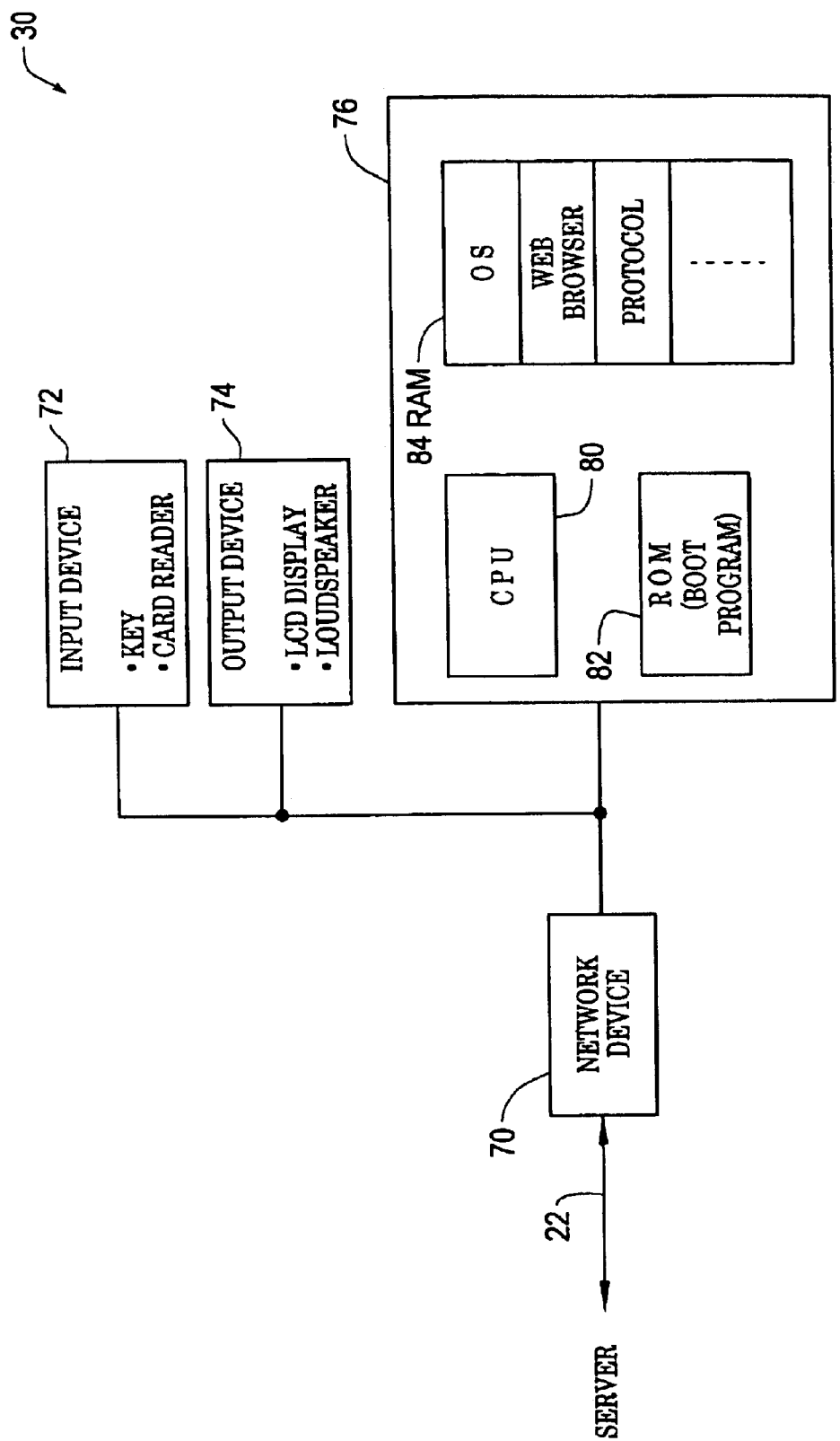
FIG. 4 is the functional block diagram of a user terminal.

FIG. 4 shows the functional block diagram of the user terminal 30. The user terminal 30 is formed by a network device 70 connected to the server 10 through the network line 22; an input device 72 in which the above various keys, a card reader (not shown), and the like are arranged; an output device 74 in which the LCD display 32, a loudspeaker (not shown), and the like are arranged; and a processing device 76.

The processing device 76 is formed by a CPU 80; a ROM 82 in which various programs are stored; and a RAM 84. In the ROM 82, a boot program for driving the CPU 80 to start the user terminal 30 when the power supply of the user terminal 30 is turned on is stored. In this embodiment, this boot program is designed in the following manner. That is, when the power supply of the user terminal is turned on, the CPU 80 accesses the memory 14 of the server 10, loads a terminal OS, a Web browser, various protocols for communication, the data of the start page of the server 10, and setup data for key allocation allocated to this home page, and downloads these data in the RAM 84.

Figure 6:
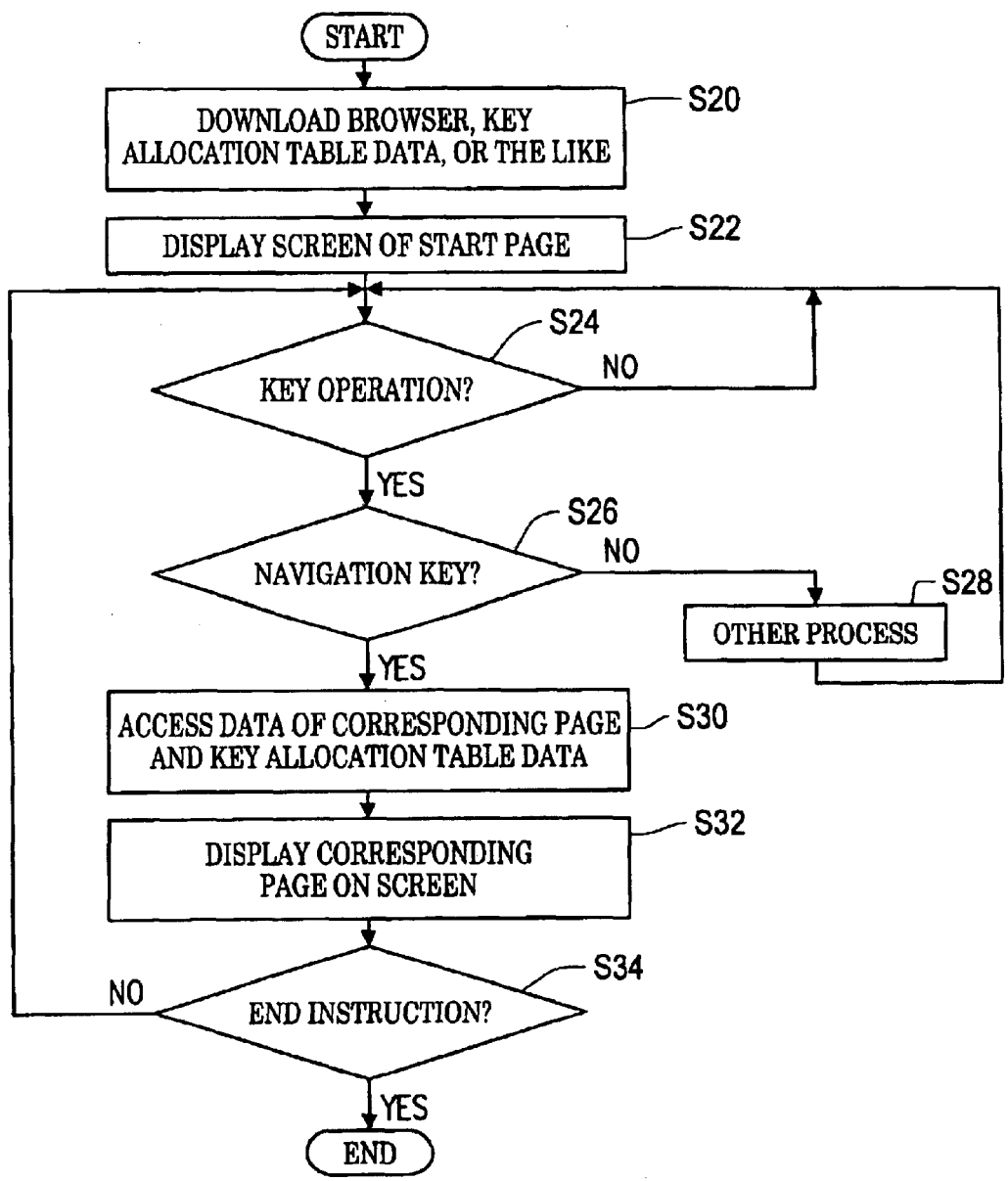
FIG. 6 is a flow chart showing the operation of the user terminal.

FIG. 6 shows an operation flow chart of the user terminal 30.

When the power supply of the user terminal 30 is turned on to start the user terminal 30, the CPU 80 accesses the server 10 through the network device 70 and the network line 22 according to the boot program stored in the ROM 82, and the CPU 80 reads the terminal OS, the Web browser, the protocols, and the other required data stored in the memory 14 and downloads them in the RAM 84 of the user terminal 30 (step S20). At this time, data for reading the start page of the server 10 is also downloaded as subordinate data.

The user terminal 30 accesses the memory 14 of the server 10 by using the Web browser to read the data of the start page from page data, and read setup data for key allocation subordinate to the data of the start page. The user terminal 30 displays these data on the display 32 as the screen of the start page, e.g., as shown in FIG. 3 (step S22). At this time, the data of the start page is displayed in the contents display area 50. On the basis of the setup data for key allocation, a function for calling an information service, a function for calling a food service, a function for searching a shopping mall, a function for calling a game, and a function for reading an external page are allocated to the multi-function keys 42-1, 42-2, . . . 42-5. The explanation of the allocated functions are displayed in the key table display area 52 as the animation characters 60 and the letter information 62. Therefore, a user can instantaneously visually determine the functions allocated to the respective keys 42.

In the start page shown in FIG. 3, a navigation function for guiding a user from a page which is displayed at present to a page for presenting the services allocated to the respective keys is set for the multi-function keys 42-1, 42-2, . . . 42-5. Therefore, when any one of keys is operated, the user can be guided to the page for presenting the corresponding service.

For example, in the start page shown in FIG. 3, when a user operates any key (step S24), the CPU 80 determines whether the operated key is one of the navigation keys 42-1, 42-2, . . . 42-5 (step S26). If it is determined that the operated key is not a navigation key, another process corresponding to the corresponding key operation is performed (step S28).

If it is determined that the operated key is a navigation key, the CPU 80 accesses the server 10 to read the data of the corresponding page and the setup data for key allocation subordinate to the data from the memory 14 (step S30), and the CPU 80 downloads the read page and the setup data to display them in the contents display area 50 and the key table display area 52. Functions corresponding to the newly read page are allocated to the respective multi-function keys 42-1, 42-2, . . . 42-5 (step S32).

As described above, in the system according to this embodiment, when any one of the multi-function keys 42-1, 42-2, . . . 42-5 of the user terminal 30 is selectively operated, the document of the page allocated to the corresponding key and the document described as setup data for key allocation are downloaded on the RAM 84 of the user terminal 30 by using the Web browser. At this time, since the downloaded page is described in the language along the specification of the HTML, the contents of the page can be displayed as an image in the contents display area 50. New functions are allocated to the multi-function keys 42-1, 42-2, . . . 42-5 on the basis of the downloaded setup data for key allocation, and the setup data is described in the language along the specification of the HTML. For this reason, the new allocated functions can be displayed in the key table display area 52 as the animation character 60 and the letter information 62.

When the data of a service to be presented is constituted as page data having a hierarchical structure as in this embodiment, the functions allocated to the multi-function keys 42 may not change in a page at an upper level and a page at a lower level. In this case, the setup data for key allocate need not be set in correspondence with the page data at the lower level. More specifically, until new setup data for key allocation is downloaded on the RAM 84 of the user terminal, function allocation of the multi-function keys 42 and displays of the animation character 60 and the letter information 62 in the key table display area 52 are performed on the basis of the setup data for key allocation which is previously downloaded.

Therefore, if the allocation function of the multi-function keys 42 does not change in the pages having a hierarchical structure, an amount of setup data for key allocation stored in the memory 14 of the server 10 can be reduced by an amount of data corresponding to the change in allocation function, and the memory 14 can be efficiently used.

In the system according to this embodiment, by operating the multi-function keys 42, the data of the next page allocated to the multi-function keys 42 is read from the server 10 and displayed on the user terminal. As a result, a user can receive various services from the server 10.

Such services are repetitively presented until the power supply of the user terminal 30 is turned off to output an instruction of the end of use (step S34).

In this embodiment, although the animation character 60 displayed in the key table display area 52 may be displayed as a still image, the animation character 60 may be displayed as moving images as shown in FIG. 7 if necessary. In this case, the series of moving images are downloaded from the server 10 onto each of the user terminals 30 as a part of the setup data for key allocation.

For example, assume that the animation character 64-4 is exemplified. That is, when any multi-function key 42 is not operated, the character 64-4 repetitively moves as shown in FIGS. 7A and 7B, and is displayed to attract attentions of a user. When the user operates the multi-function key 42-4, the character 64-4 to be displayed is displayed to be switched to a pose as if the character 64-4 represents the feelings of the user who will make a challenge to a game. In this manner, the feelings of the operation of the multi-function keys 42 are visually notified to a user, and a more useful user terminal can be realized.

Next, a case wherein merchandise is purchased by using the user terminal 30 will be briefly described.

Figure 8:
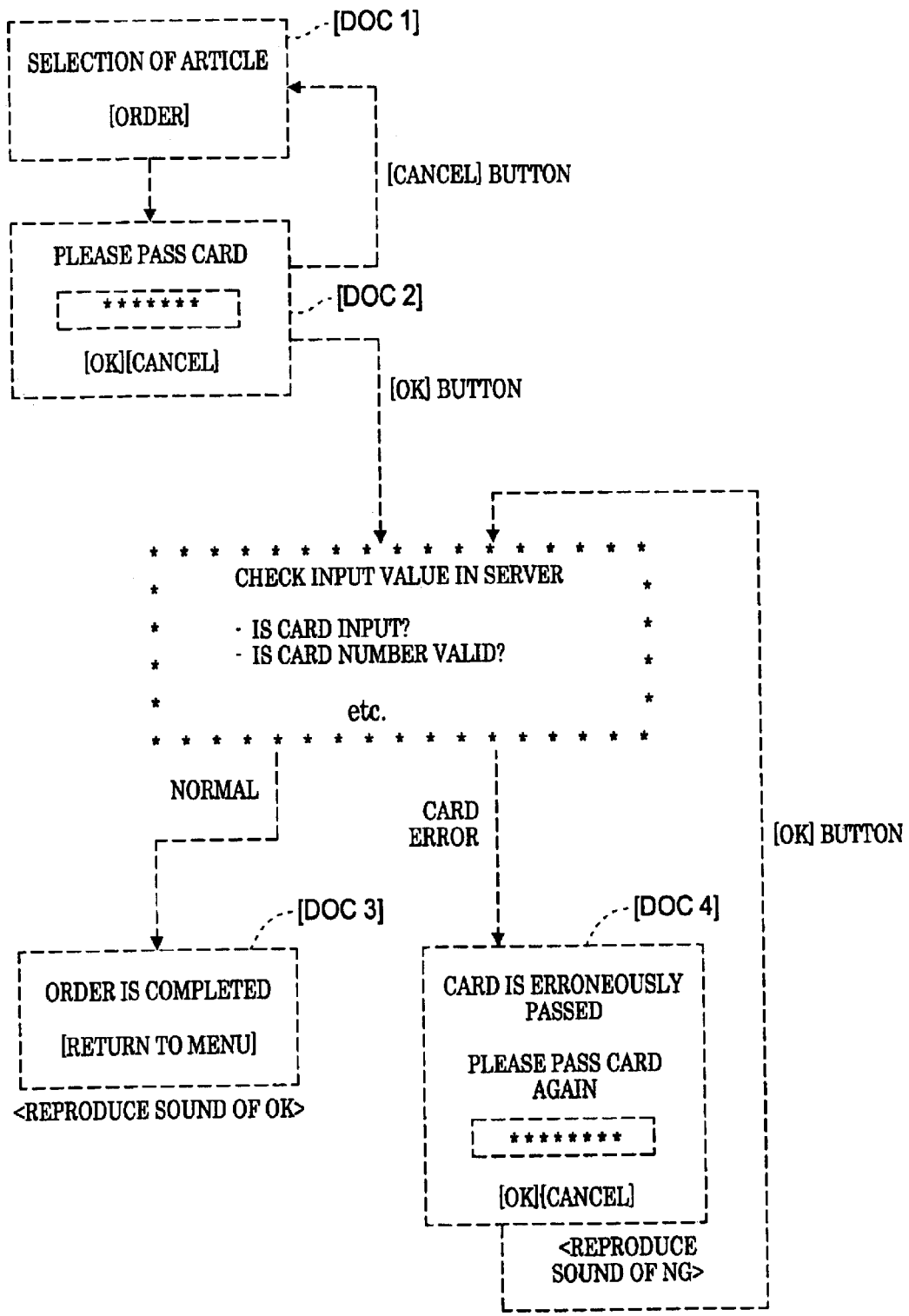
FIG. 8 is a view for explaining a procedure for on-line shopping.

FIG. 8 briefly shows a procedure of a merchandise purchase operation.

In this case, in a state wherein the start menu screen shown in FIG. 3 is displayed, a user touch-operates the multi-function key 42-3 to which a shopping mall function is allocated.

In this manner, a page, hyperlinked to the multi-function key 42-3, for ordering merchandise and setup data for key allocation subordinate to the page are downloaded from the server 10 onto the RAM 84, and a screen for selecting merchandise shown in FIG. 8 is displayed on the display 32 of the user terminal 30.

Figures 9A, 9B:
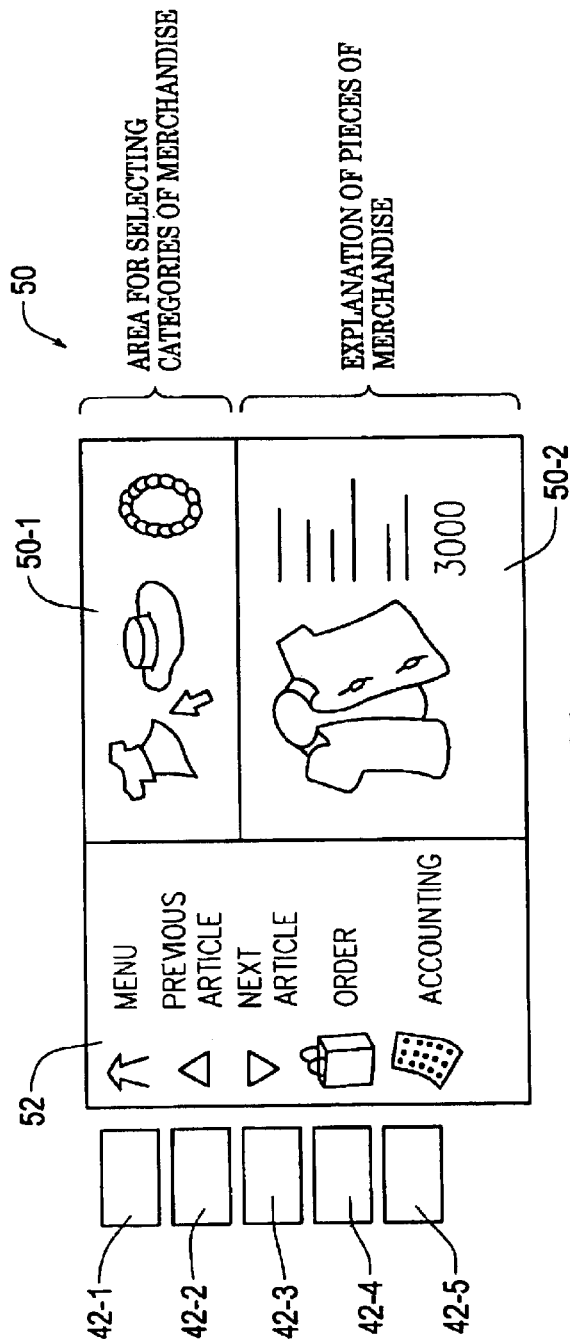
FIGS. 9A and 9B are views for explaining a screen displayed in on-line shopping.

FIG. 9A briefly shows a concrete example of the display screen obtained at this time. Here, the server message display area 54 is not displayed on the LCD display 32, only the contents display area 50 and the key table display area 52 are displayed. The contents display area 50 is displayed such that the contents display area 50 is divided into an area 50-1 for selecting the categories of merchandise and an area 50-2 for selecting explanation of pieces of merchandise corresponding to the respective categories.

In the key table display area 52, animation characters and letter information which represent that the functions of menu display, display of a previous article, display of a next article, order, and accounting are allocated to the multi-function keys 42-1, 42-2, . . . 42-5, respectively. FIG. 9B briefly shows the functions allocated to the respective keys.

A user uses the cursor key 34 shown in FIG. 2 to designate an arbitrary category of the categories of merchandise displayed on the area 50-1 (in this case, three categories, i.e., clothes, hat, and accessary), and selects the designated category by using the OK key 36. The appearance of the article of the selected category and the explanation of the article are displayed on the area 50-2. When the multifunction key 42-3 is operated, next pieces of merchandise belong to the corresponding category are sequentially displayed on the area 52. When the piece of merchandise which had been displayed is to be displayed again, the multi-function key 42-2 may be operated.

Here, the multi-function keys 42-1, 42-2, and 42-3 function as navigation keys for calling the next page.

When the merchandise displayed on the area 50-2 is to be ordered, the multi-function key 42-4 having an ordering function may be operated, and the multi-function key 42-5 representing an accounting function may be operated.

The multi-function key 42-5 representing the accounting function functions as a navigation key for reading a page for inputting card data and setup data subordinate to the page from a server. By the series of key operations, a page for inputting card data as shown in FIG. 8 is displayed as an image. In this page, one card data setting item and the account of the selected piece of merchandise are displayed. When a user cancels the piece of merchandise, the user may operate the cancel key 38. On the other hand, when the user orders the piece of merchandise, the user may operate the OK key 36 to input the data of the cash card of the user from a card reader (not shown). The card data loaded as described above is automatically set as the data of the card data setting item of the screen to be transmitted to the server side.

In this embodiment, in the page for inputting card data, only a card data setting item loaded from one card is set, and, while this screen is displayed, the data input from the card data is described in a language along the specification of the HTML such that the data is automatically received as the data of the card data setting item. Therefore, unlike a prior art, a focusing operation for clicking an input item of card data displayed on a screen with a mouse or the like need not be performed, and an operation for inputting the card data of a user can be reduced.

When the card data input as described above is transmitted from the user terminal 30 to the server 10 side, the server 10 collates the card data with a data base of a credit agency to check whether the input card number is invalid or valid. If it is determined that the card number is valid, the screen shown in FIG. 8 is displayed on the display of the user terminal 30. If it is determined that the credit number is invalid, the screen shown in FIG. 8 is displayed on the display of the corresponding user terminal.

In this manner, a user can order various pieces of merchandise from the user terminal 30.

In the system according to this embodiment, in addition to the service supplied from the server 10, the user terminal 30 can also access another WWW server 12 connected to an Internet line 10 through the server 10 to display various pages presented on the Internet line.

FIG. 11 briefly shows a procedure used in this case.

As shown in FIG. 11A, a case wherein a start screen is displayed on the display of a user terminal is assumed.

In this state, when a user operates the multi-function key 42-5 to which a function of seeing an external home page is allocated, the Web browser downloads page data hyperlinked to the multi-function key 42-5 and setup data for key allocation on the RAM 84. As shown in FIG. 11B, new navigation functions for accessing an external page are allocated to the multi-function keys 42-1, 42-2, . . . 42-5.

FIG. 11C shows an example of a screen displayed on the display at this time. At this time, explanation for seeing a general home page is preferably displayed in the page displayed in the contents display area 50.

In this state, when the user operates the multi-function key 42-4 to which a URL input function for accessing a home page is allocated, the screen of page data for inputting URL data in which alphabets and numbers incorporated in the Web browser in advance are displayed is displayed in the contents display area 50. While the user uses the cursor operation key 34 to select arbitrary numbers or letters and uses the OK key 36 to fix the input numbers or letters, the user inputs the URL of a desired home page. Therefore, the Web browser accesses the home page corresponding to this URL, and the corresponding page is downloaded to be displayed on the area 50.

In this manner, according to the system of this embodiment, the user terminal 30 also accesses another server 12 connected to the Internet line 16 through the server 10 so that not only a page prepared for the server 10 but also a desired page can be displayed on the display.

At this time, when home pages are sequentially accessed, the URLs of the accessed pages are stored in the RAM 84 as a history. Therefore, when the multi-function key 42-3 to which a function for returning to the previous function is allocated and the multi-function key 42-2 to which a function for advancing to the next page is allocated are operated, an arbitrary page can also be selected from the pages which have been accessed to be displayed on the display 50.

When the access to an external page is ended, the multi-function key 42-1 to which a function for returning to the main menu is allocated may be operated. Therefore, as shown in FIG. 11D, the data of the start page and the setup data for key allocation corresponding to the start page are downloaded from the server 10 onto the user terminal 30, and the screen of the start menu shown in FIG. 11A is displayed on the display 32.

In this embodiment, an example wherein the present invention is installed at a restaurant or the like of an amusement park is explained. However, the present invention is not limited to the embodiment, and the present invention can be used in various applications as needed.

For example, user terminals 30 according to the present invention are arranged in rooms of a hotel, so that a user of each room can order various services. In addition, the present invention can also be widely used to present various services in a baseball ground, a theater, or the like.

In this embodiment, although a case wherein five keys are arranged on amuser terminal is exemplified, keys whose number is larger or smaller than five may be used if necessary. For example, the number of keys is set to 10, and numbers are allocated to the respective keys, so that the 10 keys may be used as ten keys for inputting numeral values.

What is claimed is:

1. A network system including a server machine and a plurality of user terminals, said server machine comprising:
   a first storage device that stores data of a plurality of pages having a hyperlinked structure described in a language along a specification of an HTML, and that stores setup data described in the language along the specification of the HTML to perform allocation of functions of keys of said user terminal for each page and explanation of functions allocated to the respective keys;
   each of said user terminal comprising:
   a plurality of keys, and
   a processing device that displays a page supplied from said server machine on a display device, said processing device comprising a key allocation device that reads setup data of the corresponding other page from said server machine when another page is selected by a key operation of a user, said key allocation device further updating the functions of the keys and performing a setup operation for updating the display of the explanation of the functions of the keys on the display device.

2. A network system according to claim 1, wherein the setup data is formed to perform allocation of navigation functions of the keys for each page and explanation of the navigation functions allocated to the respective keys, and said processing device of each user terminal sets up the navigation functions of the respective keys and displays the navigation functions of the keys on the display device.

3. A network system according to claim 1, wherein the setup data is formed such that the functions allocated to the keys are displayed as explanation images.

4. A network system according to claim 3, wherein the setup data is formed such that the functions allocated to the respective keys are displayed as different explanation images in an operation state and a non-operation state of the keys.

5. A network system according to claim 1, wherein said processing device displays a screen displayed on the display device such that the screen is divided into a page display area for displaying a page supplied from said server machine and a function display area for displaying function explanation of the keys.

6. A network system according to claim 1, wherein said server machine comprises a second storage device that stores a Web browser for user terminals and data subordinate to the Web browser to search pages having a hyperlinked structure, and each of said user terminals comprises a storage device that stores a boot program for downloading the Web browser and the data subordinate to the Web browser from said second storage device in said user terminal, and said processing device displaying a home page of said server machine and performing a setup operation of the keys corresponding to the start page.

7. A network system according to claim 1, wherein the data of the plurality of pages includes data of a card data input page having a card data setting item of a user and described in a language along a specification of an HTML such that card data input from a card reader is automatically set as the data of the card data setting item, each of said user terminals comprises a card reader for inputting data of a card, and said processing device automatically sets the card data input from said card reader as the data of the card data setting item while the card data input page is displayed.

8. A network system according to claim 1, wherein the setup data is included in the data of the corresponding page.

9. A server machine comprising:
a device that stores data of a plurality of pages having a hyperlinked structure described in a language along a specification of an HTML, and
a device that stores setup data described in the language along the specification of the HTML to perform allocation of functions of keys of a user terminal for each page and explanation of the functions allocated to the respective keys, wherein data of a desired page and setup data corresponding to the data are formed such that both the data can be read by said user terminal.

10. A server machine according to claim 9, wherein the setup data is formed to perform allocation of the navigation functions of the respective keys for each page and explanation of the navigation functions allocated to the keys.

11. A server according to claim 9, wherein the setup data is formed such that the functions allocated to the keys are displayed as explanation images.

12. A server machine according to claim 11, wherein the setup data is formed such that the functions allocated to the respective keys are displayed as different explanation images in an operation state and a non-operation state of the keys.

13. A server machine according to claim 9, wherein said server machine comprises a storage device that stores a Web browser for user terminals and data subordinate to the Web browser to search pages having a hyperlinked structure, the server machine downloading the Web browser and the data subordinate to the Web browser to said corresponding user terminal.

14. A server machine according to claim 9, wherein the data of the plurality of pages includes data of a card data input page having a card data setting item of a user and described in a language along the specification of the HTML such that card data input from a card reader is automatically set as the data of the card data setting item.

15. A server machine according to claim 9, wherein the setup data is included in the data of the corresponding page.

16. A user terminal connected to a server machine which stores data of a plurality of pages having a hyperlinked structure described in a language along a specification of an HTML and that stores setup data described in the language along the specification of the HTML to perform allocation of functions of keys of said user terminal for each page and explanation of the functions allocated to the respective keys, the user terminal comprising:
a plurality of keys, and
a processing device that displays a page supplied from said server machine on a display device, said processing device including a key allocation device that reads setup data of the corresponding other page from said server machine when another page is selected by a key operation of a user, said key allocation device further updating the functions of the keys and performing a setup operation for updating the display of the explanation of the functions of the keys on the display device.

17. A user terminal according to claim 16, wherein the setup data is formed to perform allocation of the navigation functions of the respective keys for each page and explanation of the navigation functions allocated to the keys, and said processing device sets up the navigation functions of the respective keys and displays the navigation functions of the keys on the display device.

18. A user terminal according to claim 16, wherein the setup data is formed such that the functions allocated to the keys are displayed as explanation images.

19. A user terminal according to claim 18, wherein the setup data is formed such that the functions allocated to the respective keys are displayed as different explanation images in an operation state and a non-operation state of the keys.

20. A user terminal according to claim 16, wherein said processing device displays a screen displayed on the display device such that the display screen is divided into a page display area for displaying a page supplied from said server machine and a function display area for displaying function explanation of the keys.

21. A user terminal according to claim 16, further comprising a storage device that stores a boot program for downloading, from said server machine which stores a Web browser for user terminals and data subordinate to the Web browser, the Web browser and the data subordinate to the Web browser on said corresponding user terminal to search pages having a hyperlinked structure, said processing device displaying a home page of said server machine and performing a setup operation of the keys corresponding to the home page, wherein the boot program is operated at the start of the corresponding user terminal.

22. A user terminal according to claim 16, further comprising a card reader for inputting data of a card, wherein the data of the plurality of pages includes data of a card data input page having a card data setting item of a user and described in a language along the specification of the HTML such that card data input from said card reader is automatically set as the data of the card data setting item, and said processing device automatically sets the card data input from said card reader as the data of the card data setting item while the card data input page is displayed.

23. A user terminal according to claim 16, wherein the setup data is included in the data of the corresponding page.

24. A network system including a server machine and a user terminal, said server machine comprising:
 a first storage device that stores data of at least a first page and a second page, each having a hyperlinked structure described in a language along a specification of an HTML, and that stores at least first setup data and second setup data, each described in the language along the specification of the HTML to perform allocation of functions of keys of said user terminal for each page and explanation of functions allocated to the respective keys,
 the first setup data being associated with the first page,
 the second setup data being associated with the second page;
 said user terminal comprising:
  a plurality of keys, and
  a processing device that displays one of the first page and the second page supplied from said server machine on a display device,
  said processing device comprising a key allocation device that reads the first setup data from said server machine when the first page is displayed, and that reads the second setup data from said server machine when the second page is displayed,
  said key allocation device further updating the functions of the keys based on one of the first setup data and the second setup data, and performing an operation for updating the display of the explanation of the functions of the keys on the display device.

25. A server machine, comprising:
 a device that stores data of at least a first page and a second page, each having a hyperlinked structure described in a language along a specification of an HTML, and
 a device that stores at least first setup data and second setup data, each described in the language along the specification of the HTML to perform updating of the allocation of functions of keys of a user terminal for each page and explanation of the functions allocated to the respective keys, the first setup data being associated with the first page, and the second setup data being associated with the second page.

26. A user terminal connected to a server machine which stores data of at least a first page and a second page, each having a hyperlinked structure described in a language along a specification of an HTML, and that stores at least first setup data and second setup data, each described in the language along the specification of the HTML to perform allocation of functions of keys of said user terminal for each page and explanation of the functions allocated to the respective keys, the first setup data being associated with the first page, the second setup data being associated with the second page, the user terminal comprising:
 a plurality of keys, and
 a processing device that displays one of the first page and the second page supplied from said server machine on a display device,
 said processing device including a key allocation device that reads the first setup data from said server machine when the first page is displayed, and that reads the second setup data from said server machine when the second page is displayed,
 said key allocation device further updating the functions of the keys based on one of the first setup data and the second setup data, and performing an operation for updating the display of the explanation of the functions of the keys on the display device.

27. A network system according to claim 24, wherein the display device includes a message display area that displays a message transmitted spontaneously from the server machine.

* * * * *